United States Patent
Vaganay et al.

(10) Patent No.: US 9,604,712 B2
(45) Date of Patent: Mar. 28, 2017

(54) METHODS, SYSTEMS, AND APPARATUSES FOR INVERTING A SUBMERSIBLE CRAFT

(71) Applicant: Bluefin Robotics Corporation, Quincy, MA (US)

(72) Inventors: Jerome Vaganay, Arlington, MA (US); Leo Gurfinkel, Newton, MA (US)

(73) Assignee: General Dynamics Mission Systems, Inc., Fairfax, VA (US)

(*) Notice: Subject to any disclaimer, the term of this patent is extended or adjusted under 35 U.S.C. 154(b) by 0 days.

(21) Appl. No.: 14/404,395

(22) PCT Filed: May 30, 2013

(86) PCT No.: PCT/US2013/043413
§ 371 (c)(1),
(2) Date: Nov. 26, 2014

(87) PCT Pub. No.: WO2014/035508
PCT Pub. Date: Mar. 6, 2014

(65) Prior Publication Data
US 2015/0144051 A1 May 28, 2015

Related U.S. Application Data

(60) Provisional application No. 61/652,933, filed on May 30, 2012.

(51) Int. Cl.
*B63G 8/00* (2006.01)
*B63G 8/14* (2006.01)
*H01M 2/10* (2006.01)

(52) U.S. Cl.
CPC ............. *B63G 8/14* (2013.01); *B63G 8/001* (2013.01); *H01M 2/1083* (2013.01); *B63G 2008/002* (2013.01); *H01M 2220/20* (2013.01); *Y10T 29/49716* (2015.01)

(58) Field of Classification Search
CPC ... B63G 8/00; B63G 8/14; B63G 8/22; B63G 8/24; B63G 8/26
USPC ................. 114/312, 313, 315, 321, 330, 342
See application file for complete search history.

(56) References Cited

U.S. PATENT DOCUMENTS

| 3,034,467 | A | * | 5/1962 | Pestronk | ............... A63B 35/12 114/315 |
| 3,148,650 | A | | 9/1964 | Sheffield | |
| 4,864,959 | A | * | 9/1989 | Takamizawa | .......... A63B 35/12 114/315 |

(Continued)

FOREIGN PATENT DOCUMENTS

GB  2335888 A  10/1999

OTHER PUBLICATIONS

International Search Report from related PCT Application No. PCT/US2013/043413.

*Primary Examiner* — Daniel V Venne
(74) *Attorney, Agent, or Firm* — Lorenz & Kopf, LLP (LKGlobal)

(57) ABSTRACT

Autonomous, unmanned submersible can turn upside down in order to use instrumentation placed on one side only. Batteries (106) and instrumentation housing (104) are installed on frame rails (112,14,108,110) and can change their relative positions, thus inverting the relative positions between center of buoyancy and center of gravity and subsequently inverting the submersible.

15 Claims, 8 Drawing Sheets

(56) References Cited

U.S. PATENT DOCUMENTS

| | | | | |
|---|---|---|---|---|
| 5,327,849 A | * | 7/1994 | Miller | B63C 11/202 |
| | | | | 114/315 |
| 2007/0022935 A1 | * | 2/2007 | Griffith | B63C 11/02 |
| | | | | 114/312 |
| 2012/0048172 A1 | * | 3/2012 | Lotz | B63G 8/16 |
| | | | | 114/330 |

* cited by examiner

US 9,604,712 B2

METHODS, SYSTEMS, AND APPARATUSES FOR INVERTING A SUBMERSIBLE CRAFT

CROSS-REFERENCE TO RELATED APPLICATIONS

This application is a National Stage Entry under 35 U.S.C. 371 of PCT Patent Application No. PCT/US2013/043413, filed May 30, 2013, which claims priority from U.S. Provisional Patent Application No. 61/652,933, filed on May 30, 2012, each of which is incorporated by reference herein in its entirety.

STATEMENT REGARDING FEDERALLY SPONSORED RESEARCH OR DEVELOPMENT

This invention was made with Government support under N00174-07-D-0008 awarded by NAVSEA Indian Head. The Government has certain rights in this invention.

BACKGROUND

Various unmanned submersible crafts are in use today by the military, scientific, and recreational communities. The submersible crafts may be used for a variety of tasks, and may be outfitted with a variety of equipment for performing those tasks.

One such task may include inspection of underwater structures or of the seafloor via sonar devices. However, due to size constrains, weight constraints, and cost, it may not be practical to outfit a submersible craft with a sonar system capable of directing sonar to both sides of the craft simultaneously. For example, the sonar might be limited to being directed out of the port side of the craft only. Thus, a need exists for a submersible craft that is capable of being inverted so as to direct the sonar out of the opposite side of the craft, and a system and method for achieving such an inversion.

SUMMARY

In one embodiment, a submersible craft is provided, the submersible craft comprising: an apparatus for selectively positioning a battery and a main electronics housing ("MEH") within the submersible craft, the apparatus comprising: a battery; a battery rail apparatus comprising a first battery frame rail substantially vertically oriented within the submersible craft and a second battery frame rail substantially vertically oriented within the submersible craft, wherein the first battery frame rail is positioned on a first side of the submersible craft and the second battery frame rail is positioned on a second side of the submersible craft substantially opposite the first side of the submersible craft, wherein a first end of the battery is slidably connected to the first battery frame rail and a second end of the battery is slidably connected to the second battery frame rail; an MEH; an MEH rail apparatus comprising a first MEH frame rail substantially vertically oriented within the submersible craft and a second MEH frame rail substantially vertically oriented within the submersible craft, wherein the first MEH frame rail is positioned on a first side of the submersible craft and the second MEH frame rail is positioned on a second side of the submersible craft substantially opposite the first side of the submersible craft, wherein a first end of the MEH is slidably connected to the first MEH frame rail and a second end of the MEH is slidably connected to the second MEH frame rail; and wherein the battery comprises a substantially negative buoyancy and the MEH comprises a substantially positive buoyancy.

In another embodiment, a submersible craft is provided, the submersible craft comprising: an apparatus for selectively positioning a battery and an MEH within the submersible craft, the apparatus comprising: a battery rail apparatus comprising a first battery frame rail substantially vertically oriented within the submersible craft and a second battery frame rail substantially vertically oriented within the submersible craft, wherein the first battery frame rail is positioned on a first side of the submersible craft and the second battery frame rail is positioned on a second side of the submersible craft substantially opposite the first side of the submersible craft, and wherein the first battery frame rail and the second battery frame rail are configured to be slidably connected to first and second ends of a battery, respectively; an MEH rail apparatus comprising a first MEH frame rail substantially vertically oriented within the submersible craft and a second MEH frame rail substantially vertically oriented within the submersible craft, wherein the first MEH frame rail is positioned on a first side of the submersible craft and the second MEH frame rail is positioned on a second side of the submersible craft substantially opposite the first side of the submersible craft, and wherein the first MEH frame rail and the second MEH frame rail are configured to be slidably connected to first and second ends of an MEH.

In one embodiment, a system for selectively positioning a battery and an MEH within a submersible craft is provided, the system comprising: a battery; a battery rail apparatus comprising a first battery frame rail configured to be substantially vertically oriented within the submersible craft and a second battery frame rail configured to be substantially vertically oriented within the submersible craft, wherein the first battery frame rail is configured to be positioned on a first side of the submersible craft and the second battery frame rail is configured to be positioned on a second side of the submersible craft substantially opposite the first side of the submersible craft, wherein a first end of the battery is slidably connected to the first battery frame rail and a second end of the battery is slidably connected to the second battery frame rail; an MEH; an MEH rail apparatus comprising a first MEH frame rail configured to be substantially vertically oriented within the submersible craft and a second MEH frame rail configured to be substantially vertically oriented within the submersible craft, wherein the first MEH frame rail is configured to be positioned on a first side of the submersible craft and the second MEH frame rail is configured to be positioned on a second side of the submersible craft substantially opposite the first side of the submersible craft, wherein a first end of the MEH is slidably connected to the first MEH frame rail and a second end of the MEH is slidably connected to the second MEH frame rail; and wherein the battery comprises a substantially negative buoyancy and the MEH comprises a substantially positive buoyancy.

In another embodiment, an apparatus for selectively positioning a battery and an MEH within a submersible craft is provided, the apparatus comprising: a battery; a battery rail apparatus substantially vertically oriented within the submersible craft, wherein the battery rail apparatus includes a first battery rail and a second battery rail, and wherein the first battery rail and the second battery rail are slidably connected to the submersible craft; an MEH; an MEH rail apparatus substantially vertically oriented within the submersible craft, wherein the MEH rail apparatus includes a first MEH rail and a second MEH rail, and wherein the first MEH rail and the second MEH rail are slidably connected to the submersible craft; wherein the battery comprises a substantially negative buoyancy and the MEH comprises a substantially positive buoyancy.

In another embodiment, a method for selectively inverting a submersible craft is provided, the method comprising: providing a battery contained on a battery rail apparatus, wherein the battery rail apparatus is substantially vertically positioned within the submersible craft and is configured to selectively position the battery in one of a battery lower position and a battery upper position; providing an MEH contained on an MEH rail apparatus, wherein the MEH rail apparatus is substantially vertically positioned within the submersible craft and is configured to selectively position the MEH in one of an MEH upper position and an MEH lower position; providing an external shell upon the submersible craft; removing the external shell; moving the battery from the battery lower position to the battery upper position; moving the MEH from the MEH upper position to the MEH lower position, wherein the battery comprises a substantially negative buoyancy and the MEH comprises a substantially positive buoyancy; and replacing the external shell.

In another embodiment, a method for selectively inverting a submersible craft is provided, the method comprising: providing a battery contained on a battery rail apparatus, wherein the battery rail apparatus is substantially vertically positioned within the submersible craft and is configured to selectively position the battery in one of a battery lower position and a battery upper position; providing an MEH contained on an MEH rail apparatus, wherein the MEH rail apparatus is substantially vertically positioned within the submersible craft and is configured to selectively position the MEH in one of an MEH upper position and an MEH lower position; moving the battery from the battery lower position to the battery upper position; and moving the MEH from the MEH upper position to the MEH lower position, wherein the battery comprises a substantially negative buoyancy and the MEH comprises a substantially positive buoyancy.

In another embodiment, a method for selectively inverting a submersible craft is provided, the method comprising: moving a battery contained within the submersible craft from a battery lower position to a battery upper position; and moving an MEH within the submersible craft from an MEH upper position to an MEH lower position, wherein the battery comprises a substantially negative buoyancy and the MEH comprises a substantially positive buoyancy.

BRIEF DESCRIPTION OF THE DRAWINGS

The accompanying figures, which are incorporated in and constitute a part of the specification, illustrate various example apparatuses, systems, and methods, and are used merely to illustrate various example embodiments.

DETAILED DESCRIPTION

Figure 1:
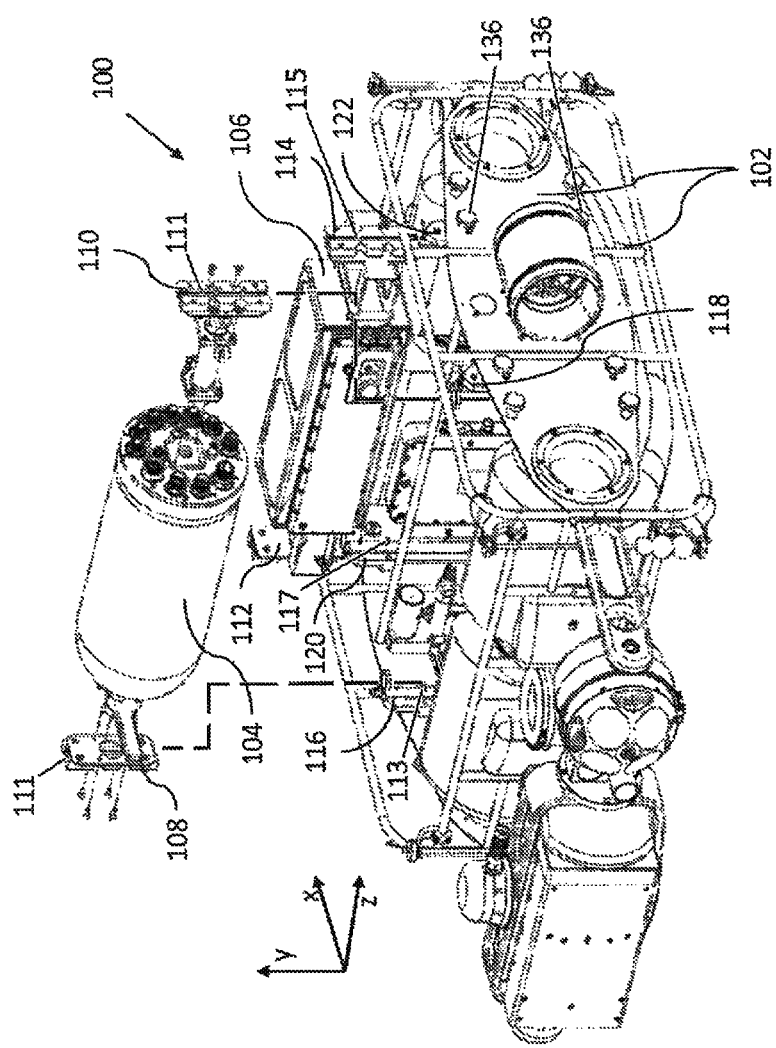
FIG. 1 illustrates an example arrangement of a submersible craft configured to selectively invert.

FIG. 1 illustrates a perspective view of an example arrangement of a submersible craft 100 configured to selectively invert. Submersible craft 100 may be configured to operate in a liquid medium, such as water. Submersible craft 100 includes a frame 102, an MEH 104, and a battery 106. MEH 104 includes an MEH rail apparatus including a first MEH rail 108 and a second MEH rail 110. Battery 106 includes a battery rail apparatus including a first battery rail 112 and a second battery rail 114. In one embodiment, frame 102 further includes a first MEH frame rail 116, a second MEH frame rail 118, a first battery frame rail 120, and a second battery frame rail 122.

Submersible craft 100 may include any unmanned submersible craft. Submersible craft 100 may be fitted with various propulsion systems, including for example thrusters and propellers. Submersible craft 100 may be fitted with various steering components, including for example rudders and hydroplanes. In one embodiment, submersible craft 100 includes an exterior shell or fairing (not shown) which may be configured to provide protection to interior components and/or improve hydrodynamic characteristics of submersible craft 100. The exterior shell or fairing may comprise at least one of a metal, polymer, and composite material. Submersible craft 100 may include various optical devices, including for example cameras. Submersible craft 100 may include a ballast device to affect its buoyancy.

Submersible craft 100 may additionally include a sonar device. In one embodiment, submersible craft 100 includes a sonar device configured to direct sonar out of only one side of the craft, including, for example, the port or starboard side of the craft. In one embodiment, submersible craft 100 is configured to invert by rotating 180 degrees about the x-axis and/or z-axis. As a result, the sonar device will selectively direct sonar out of either side of the craft.

Frame 102 may comprise the structural components of submersible craft 100. In one embodiment, frame 102 includes a rigid tubing material. In another embodiment, frame 102 includes panels. In another embodiment, frame 102 includes a combination of rigid tubing material and panels. Frame 102 may comprise at least one of a metal, polymer, and composite material. In one embodiment, frame 102 comprises a tubing material oriented about the exterior of submersible craft 100 to provide both rigid structure to submersible craft 100 and protection of the various components of submersible craft 100. In this embodiment, panels may be oriented on at least the port and starboard sides of submersible craft 100 and configured to support the various components of submersible craft 100.

MEH 104 may include at least one of the electronic controls, signaling components, and processing components. In one embodiment, MEH 104 is the central computer of submersible craft 100 and is responsible for all electronic function of submersible craft 100. In one embodiment, MEH 104 includes the electrical circuitry responsible for controls and signaling in submersible craft 100. MEH 104 may be sealed so as to be at least substantially impervious to a liquid (e.g., water). In one embodiment, MEH 104 includes a series of wires and cables extending therefrom and connected to the various electrical components of submersible craft 100. In another embodiment, MEH 104 is connected to a host vessel, which is one or more of physically, electrically, or optically connected to submersible craft 100. In another embodiment, MEH 104 is connected to a host vessel, which is a ship on the surface of the water from which submersible craft 100 operates. In one embodiment, MEH 104 has a substantially positive buoyancy, wherein the weight of liquid that MEH 104 displaces is greater than the weight of MEH 104. Stated alternatively, the buoyant force acting on MEH 104 is greater than the gravitational force acting on MEH 104. In this embodiment, MEH 104 may have a tendency to float toward the surface of the liquid medium. In another embodiment, MEH 104 has a substantially negative buoyancy.

MEH 104 includes an MEH rail apparatus, including in one embodiment a first MEH rail 108, a second MEH rail 110, a first MEH frame rail 116, and a second MEH frame rail 118. In another embodiment, the MEH rail apparatus includes a first MEH rail 108 and a second MEH rail 110. In another embodiment, MEH rail apparatus includes a first MEH frame rail 116 and a second MEH frame rail 118. In one embodiment, the MEH rail apparatus is substantially vertically positioned within submersible craft 100 so as to be substantially parallel to the y-axis. First MEH rail 108 is positioned on a first side of submersible craft 100, and second MEH rail 110 is positioned on a second side of submersible craft 100. In one embodiment, first MEH rail 108 is positioned substantially opposite second MEH rail 110. First MEH rail 108 and second MEH rail 110 may be removably connected to a first and second end of MEH 104, respectively, for example, through the use of bolts, screws, rivets, pins, straps, cam locks, and keyhole slots. In another embodiment, first MEH rail 108 and second MEH rail 110 are integrally connected to a first and second end of MEH 104, respectively. First MEH rail 108 and second MEH rail 110 may comprise at least one of a metal, a polymer, and a composite material.

First MEH frame rail 116 and second MEH frame rail 118 may be removably connected to submersible craft 100 and/or frame 102, for example, through the use of bolts, screws, rivets, pins, straps, cam locks, and keyhole slots. In another embodiment, first MEH frame rail 116 and second MEH frame rail 118 are integrally connected to frame 102. First MEH frame rail 116 and second MEH frame rail 118 may comprise at least one of a metal, a polymer, and a composite material. In one embodiment, first MEH frame rail 116 and second MEH frame rail 118 are substantially vertically positioned within submersible craft 100 so as to be substantially aligned with the y-axis.

In one embodiment, first MEH rail 108 and second MEH rail 110 are slidably connected to first MEH frame rail 116 and second MEH frame rail 118, respectively. In one embodiment, first MEH rail 108 and second MEH rail 110 include at least one of a groove, a ridge, and a channel (groove 111 depicted) configured to mate in slidable connection with a corresponding groove, ridge, or channel (ridge 113 depicted) on first MEH frame rail 116 and second MEH frame rail 118. In another embodiment, first MEH rail 108 and second MEH rail 110 include a ring or rod configured to mate in slidable connection with a corresponding ring or rod on first MEH frame rail 116 and second MEH frame rail 118, such that the ring portion fits around the periphery of the rod portion and is able to selectively slide along the rod. In one embodiment, first MEH rail 108 slidably connects to first MEH frame rail 116, and second MEH rail 110 slidably connects to second MEH frame rail 118. In one embodiment, a first end of MEH 104 is slidably connected to first MEH frame rail 116 and a second end of MEH 104 is slidably connected to second MEH frame rail 118.

In one embodiment, one or more of first MEH rail 108, second MEH rail 110, first MEH frame rail 116, and second MEH frame rail 118 may include devices to assist in the slidable connection, including for example bearing surfaces or roller bearings.

In one embodiment, first MEH rail 108 and second MEH rail 110 are selectively slidably connected to first MEH frame rail 116 and second MEH frame rail 118, respectively, and at least one of first MEH rail 108, second MEH rail 110, first MEH frame rail 116, and second MEH frame rail 118 include at least one stop configured to act as the bound of slidable movement of MEH 104. In one embodiment, the at least one stop is removably connected to at least one of first MEH rail 108, second MEH rail 110, first MEH frame rail 116, and second MEH frame rail 118, for example, through the use of bolts, screws, rivets, pins, straps, cam locks, and keyhole slots. In another embodiment, the at least one stop is integrally connected to at least one of first MEH rail 108, second MEH rail 110, first MEH frame rail 116, and second MEH frame rail 118. In one embodiment, each set of corresponding rails (i.e., first MEH rail 108 and first MEH frame rail 116, and second MEH rail 110 and second MEH frame rail 118) includes an upper stop and lower stop (as defined by the y-axis), such that the slidable movement of MEH 104 is constrained between the upper stop and the lower stop.

In one embodiment, MEH 104 is selectively slidably positioned in relation to submersible craft 100. MEH 104 may be selectively locked in an MEH upper position and MEH lower position. In one embodiment, MEH 104 is selectively locked into position by one or more of a captive screw, a bolt, a pin, a clip, and a strap. In one embodiment, MEH 104 is selectively locked into position using a captive screw 134 configured to engage at least one of first MEH rail 108, second MEH rail 110, first MEH frame rail 116, and second MEH frame rail 118 and prevent movement between first MEH rail 108 and first MEH frame rail 116, and between second MEH rail 110 and second MEH frame rail 118. In another embodiment, MEH 104 is selectively locked into position using a captive screw 134 configured to engage MEH 104 with frame 102. In another embodiment, MEH 104 is selectively locked into position using a captive screw 134 configured to engage at least one of first MEH rail 108, second MEH rail 110, first MEH frame rail 116, and second MEH frame rail 118 with frame 102.

Battery 106 may include any known battery device capable of storing electrical energy. In one embodiment, battery 106 is configured to electrically connect to MEH 104 thereby providing electrical energy to MEH 104. In another embodiment, battery 106 is electrically connected to the various electrical components within submersible craft 100 thereby providing electrical energy to the various electrical components within submersible craft 100. In one embodiment, battery 106 sealed so as to be at least substantially impervious to a liquid (e.g., water). In one embodiment, battery 106 has a substantially negative buoyancy, wherein the weight of liquid that battery 106 displaces is less than the weight of battery 106. Stated alternatively, the buoyant force acting on battery 106 is less than the gravitational force acting on battery 106. In this embodiment, battery 106 may have a tendency to sink toward the floor of the liquid medium. In another embodiment, battery 106 has a substantially positive buoyancy. In one embodiment, battery 106 may include a mass that is greater than the mass of MEH 104. In another embodiment, battery 106 may include a mass that is less than the mass of MEH 104.

Battery 106 includes a battery rail apparatus, including first battery rail 112, second battery rail 114, first battery frame rail 120, and second battery frame rail 122. In another embodiment, battery rail apparatus includes a first battery rail 112 and a second battery rail 114. In another embodiment, the battery rail apparatus includes a first battery frame rail 120 and a second battery frame rail 122. In one embodiment, the battery rail apparatus is substantially vertically positioned within submersible craft 100 so as to be substantially aligned with the y-axis. First battery rail 112 is positioned on a first side of submersible craft 100, and second battery rail 114 is positioned on a second side of submersible craft 100. In one embodiment, first battery rail 112 is positioned opposite second battery rail 114. First battery rail 112 and second battery rail 114 may be removably connected to a first and second end of battery 106, respectively, for example, through the use of bolts, screws, rivets, pins, straps, cam locks, and keyhole slots. In another embodiment, first battery rail 112 and second battery rail 114 are integrally connected to a first and second end of battery 106, respectively. First battery rail 112 and second battery rail 114 may comprise at least one of a metal, a polymer, and a composite material.

First battery frame rail 120 and second battery frame rail 122 may be removably connected to frame 102, for example, through the use of bolts, screws, rivets, pins, straps, cam locks, and keyhole slots. In one embodiment, first battery frame rail 120 and second battery frame rail 122 are integrally connected to frame 102. First battery frame rail 120 and second battery frame rail 122 may comprise at least one of a metal, a polymer, and a composite material. In one embodiment, first battery frame rail 120 and second battery frame rail 122 are substantially vertically positioned within submersible craft 100 so as to be substantially aligned with the y-axis.

In one embodiment, first battery rail 112 and second battery rail 114 are slidably connected to first battery frame rail 120 and second battery frame rail 122 respectively. In one embodiment, first battery rail 112 and second battery rail 114 include at least one of a groove, a ridge, and a channel (groove 115 depicted) configured to mate in slidable connection with a corresponding groove, ridge, or channel (ridge 117 depicted) on first battery frame rail 120 and second battery frame rail 122. In another embodiment, first battery rail 112 and second battery rail 114 include a ring or rod configured to mate in slidable connection with a corresponding ring or rod on first battery frame rail 120 and second battery frame rail 122, such that the ring portion fits around the periphery of the rod portion and is able to selectively slide along the rod. In one embodiment, first battery rail 112 slidably connects to first battery frame rail 120, and second battery rail 114 slidably connects to second battery frame rail 122. In one embodiment, a first end of battery 106 is slidably connected to first battery frame rail 120 and a second end of battery 106 is slidably connected to second battery frame rail 122.

In one embodiment, one or more of first battery rail 112, second battery rail 114, first battery frame rail 120, and second battery frame rail 122 may include devices to assist in the slidable connection, including for example bearing surfaces or roller bearings.

In one embodiment, first battery rail 112 and second battery rail 114 are selectively slidably connected to first battery frame rail 120 and second battery frame rail 122, respectively, and at least one of first battery rail 112, second battery rail 114, first battery frame rail 120, and second battery frame rail 122 include at least one stop configured to act as the bound of slidable movement of battery 106. In one embodiment, the at least one stop is removably connected to at least one of first battery rail 112, second battery rail 114, first battery frame rail 120, and second battery frame rail 122, for example, through the use of bolts, screws, rivets, pins, straps, cam locks, and keyhole slots. In another embodiment, the at least one stop is integrally connected to at least one of first battery rail 112, second battery rail 114, first battery frame rail 120, and second battery frame rail 122. In one embodiment, each set of corresponding rails (i.e., first battery rail 112 and first battery frame rail 120, and second battery rail 114 and second battery frame rail 122) includes an upper stop and lower stop (as defined by the y-axis), such that the slidable movement of battery 106 is constrained between the upper stop and the lower stop.

In one embodiment, battery 106 is selectively slidably positioned in relation to submersible craft 100. Battery 106 may be selectively locked in a battery upper position and a battery lower position. In one embodiment, battery 106 is selectively locked into position by one or more of a captive screw, a bolt, a pin, a clip, and a strap. In one embodiment, battery 106 is selectively locked into position using a captive screw 136 configured to engage at least one of first battery rail 112, second battery rail 114, first battery frame rail 120, and second battery frame rail 122, and prevent movement between first battery rail 112 and first battery frame rail 120, and between second battery rail 114 and second battery frame rail 122. In another embodiment, battery 106 is selectively locked into position using a captive screw 136 configured to engage battery 106 with frame 102. In another embodiment, battery 106 is selectively locked into position using a captive screw 136 configured to engage at least one of first battery rail 112, second battery rail 114, first battery frame rail 120, and second battery frame rail 122 with frame 102.

In one embodiment, submersible craft 100 includes: an apparatus for selectively positioning battery 106 and MEH 104 within the submersible craft 100, the apparatus comprising: battery 106; a battery rail apparatus comprising first battery frame rail 120 substantially vertically oriented within submersible craft 100 and second battery frame rail 122 substantially vertically oriented within submersible craft 100, wherein first battery frame rail 120 is positioned on a first side of submersible craft 100 and second battery frame rail 122 is positioned on a second side of submersible craft 100 substantially opposite the first side of submersible craft 100. The apparatus additionally comprises a first end of battery 106 slidably connected to first battery frame rail 120 and a second end of battery 106 slidably connected to second battery frame rail 122. The apparatus further includes MEH 104; an MEH rail apparatus comprising first MEH frame rail 116 substantially vertically oriented within submersible craft 100 and second MEH frame rail 118 substantially vertically oriented within submersible craft 100, wherein first MEH frame rail 116 is positioned on a first side of submersible craft 100 and second MEH frame rail 118 is positioned on a second side of submersible craft 100 substantially opposite the first side of submersible craft 100. A first end of MEH 104 is slidably connected to first MEH frame rail 116 and a second end of MEH 104 is slidably connected to second MEH frame rail 118. In one embodiment, battery 106 comprises a substantially negative buoyancy and MEH 104 comprises a substantially positive buoyancy.

In another embodiment, a submersible craft 100 comprises: an apparatus for selectively positioning battery 106 and MEH 104 within submersible craft 100, the apparatus comprising: a battery rail apparatus comprising first battery frame rail 120 substantially vertically oriented within submersible craft 100 and second battery frame rail 122 substantially vertically oriented within submersible craft 100, wherein first battery frame rail 120 is positioned on a first side of submersible craft 100 and second battery frame rail 122 is positioned on a second side of submersible craft 100 substantially opposite the first side of submersible craft 100. First battery frame rail 120 and second battery frame rail 122 are configured to be slidably connected to first and second ends of battery 106, respectively. The apparatus also comprises an MEH rail apparatus comprising first MEH frame rail 116 substantially vertically oriented within submersible craft 100 and second MEH frame rail 118 substantially vertically oriented within submersible craft 100, wherein first MEH frame rail 116 is positioned on a first side of submersible craft 100 and second MEH frame rail 118 is positioned on a second side of submersible craft 100 substantially opposite the first side of submersible craft 100. First MEH frame rail 116 and second MEH frame rail 118 are configured to be slidably connected to first and second ends of MEH 104.

In one embodiment, a system for selectively positioning battery 106 and MEH 104 within submersible craft 100 is provided, the system comprising: battery 106; a battery rail apparatus comprising first battery frame rail 120 configured to be substantially vertically oriented within submersible craft 100 and second battery frame rail 122 configured to be substantially vertically oriented within submersible craft 100, wherein first battery frame rail 120 is configured to be positioned on a first side of submersible craft 100 and second battery frame rail 122 is configured to be positioned on a second side of submersible craft 100 substantially opposite the first side of submersible craft 100. A first end of battery 106 is slidably connected to first battery frame rail 120 and a second end of the battery is slidably connected to second battery frame rail 122. The apparatus also includes MEH 104; an MEH rail apparatus comprising first MEH frame rail 116 configured to be substantially vertically oriented within submersible craft 100 and second MEH frame rail 118 configured to be substantially vertically oriented within submersible craft 100, wherein first MEH frame rail 116 is configured to be positioned on a first side of submersible craft 100 and second MEH frame rail 118 is configured to be positioned on a second side of submersible craft 100 substantially opposite the first side of submersible craft 100. A first end of MEH 104 is slidably connected to first MEH frame rail 116 and a second end of MEH 104 is slidably connected to second MEH frame rail 118. Battery 106 comprises a substantially negative buoyancy and MEH 104 comprises a substantially positive buoyancy.

In another embodiment, an apparatus for selectively positioning battery 106 and MEH 104 within submersible craft 100 is provided, the apparatus comprising: battery 106; a battery rail apparatus substantially vertically oriented within submersible craft 100, wherein the battery rail apparatus includes first battery rail 112 and second battery rail 114, and wherein first battery rail 112 and second battery rail 114 are slidably connected to submersible craft 100. The apparatus also includes MEH 104; an MEH rail apparatus substantially vertically oriented within submersible craft 100, wherein the MEH rail apparatus includes first MEH rail 108 and second MEH rail 110, and wherein first MEH rail 108 and second MEH rail 110 are slidably connected to submersible craft 100. Battery 106 comprises a substantially negative buoyancy and MEH 104 comprises a substantially positive buoyancy.

Figure 2:
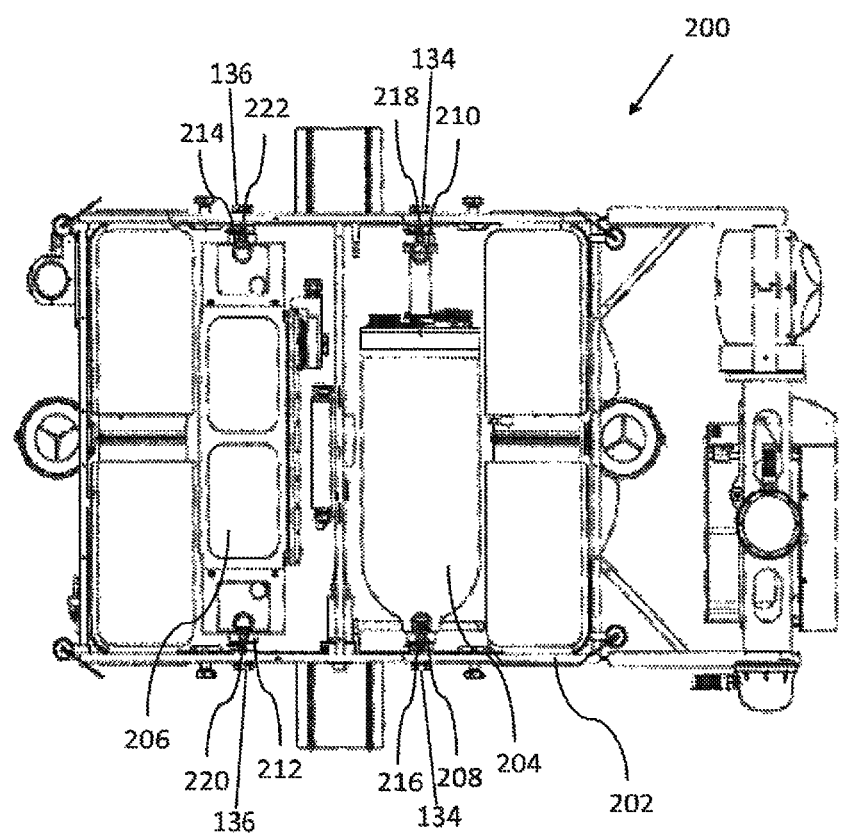
FIG. 2 illustrates an example arrangement of a submersible craft configured to selectively invert.

FIG. 2 illustrates a top plan view of an example arrangement of a submersible craft 200 configured to selectively invert. Submersible craft 200 includes a frame 202, an MEH 204, and a battery 206. MEH 204 includes an MEH rail apparatus including a first MEH rail 208 and a second MEH rail 210. Battery 206 includes a battery rail apparatus including a first battery rail 212 and a second battery rail 214. In one embodiment, frame 202 further includes a first MEH frame rail 216, a second MEH frame rail 218, a first battery frame rail 220, and a second battery frame rail 222.

Figure 3:
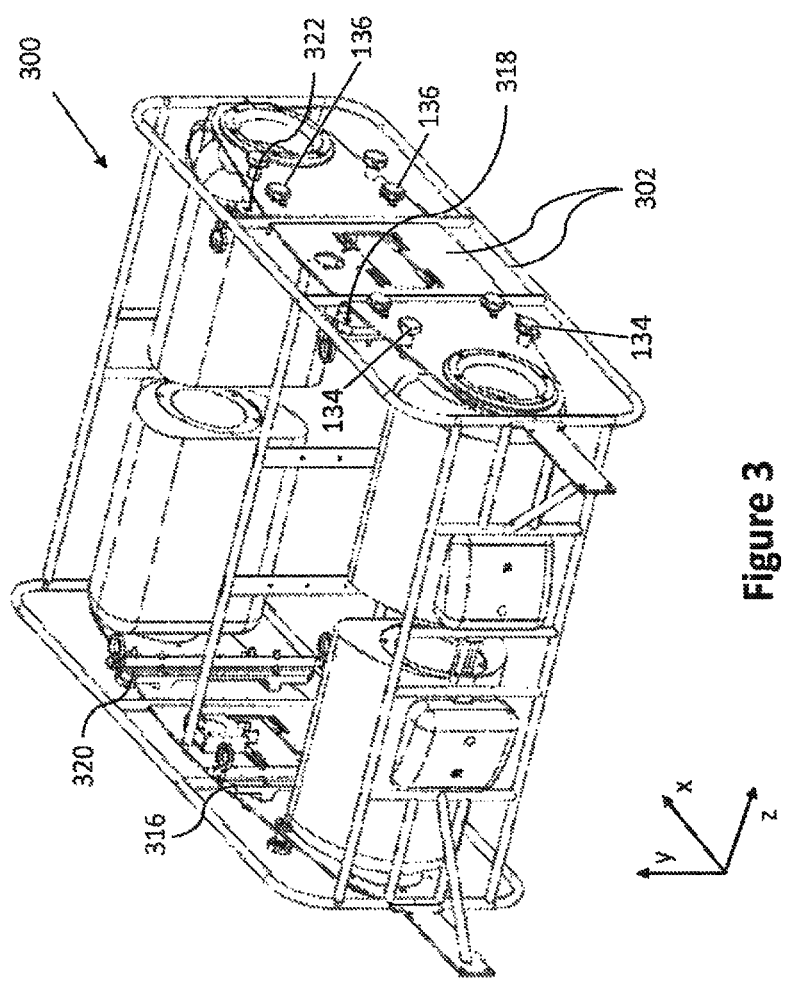
FIG. 3 illustrates an example arrangement of a submersible craft configured to selectively invert.

FIG. 3 illustrates a perspective view of an example arrangement of a submersible craft 300 configured to selectively invert. Submersible craft 300 includes a frame 302. In one embodiment, frame 302 further includes a first MEH frame rail 316, a second MEH frame rail 318, a first battery frame rail 320, and a second battery frame rail 322.

Figure 4:
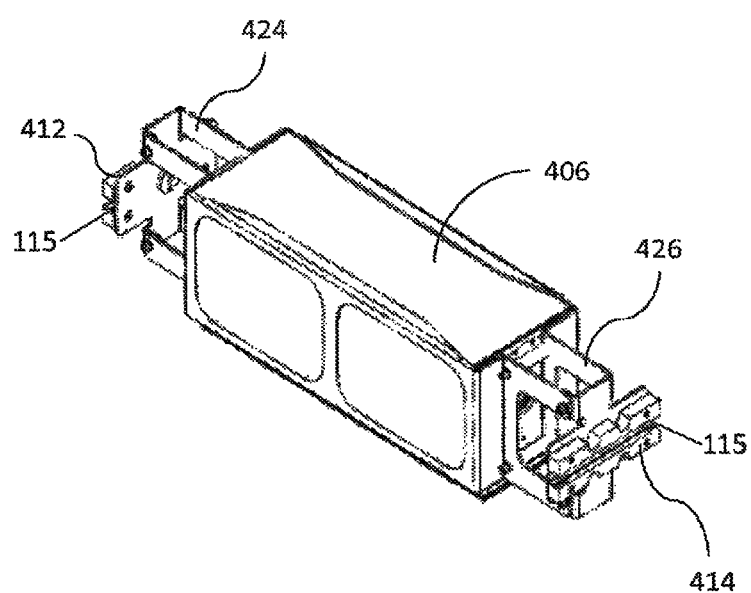
FIG. 4 illustrates an example arrangement of a battery in a submersible craft configured to selectively invert.

FIG. 4 illustrates a perspective view of an example arrangement of battery 406 in a submersible craft configured to selectively invert (not shown). Battery 406 includes a battery rail apparatus including a first battery rail 412 and a second battery rail 414. In one embodiment, battery 406 includes a first battery rail attachment 424 and a second battery rail attachment 426. First battery rail attachment 424 and second battery rail attachment 426 may be configured to attach battery 406 to first battery rail 412 and second battery rail 414, respectively. In another embodiment, first battery rail attachment 424 and second battery rail attachment 426 may be removably or integrally connected to a battery cradle (not shown), which is configured to contain and support battery 406. The battery cradle may comprise at least one of a metal, a polymer, or a composite material. In one embodiment, a battery cradle is removably or integrally connected to at least one of first battery rail 412 and a second battery rail 414. In another embodiment, a battery cradle is slidably connectable to at least one of a first battery frame rail (not shown) and a second battery frame rail (not shown).

In operation, submersible craft 100, 200, and 300 may include a sonar device configured to direct sonar out of a single side of the craft (e.g., port side only). When it is desired to direct sonar out of the opposite side of submersible craft 100, 200, and 300 (e.g., from port side to starboard side), submersible craft 100, 200, and 300 may be inverted 180 degrees about the x-axis and/or z-axis, thereby causing sonar to be directed out of the opposite side of submersible craft 100, 200, and 300 (e.g., the starboard side). In one embodiment, submersible craft 100, 200, and 300 is symmetrical about its horizontal plane (x-z plane), such that the craft's upper portion is a mirror image of its lower portion. In such an embodiment, the symmetry of submersible craft 100, 200, and 300 permits operation of submersible craft 100, 200, and 300 in an inverted state that is essentially identical to its operation in a normal state. In one embodiment, submersible craft 100, 200, and 300 is permeable to the liquid medium. In another embodiment, submersible craft 100, 200, and 300 is configured to operate while flooded with liquid medium.

Although not wishing to be bound by a particular theory, submersible craft 100, 200, and 300 has a center of buoyancy and a center of gravity when submerged. A submerged craft's center of buoyancy is its immersed center of mass. Stated differently, submerged craft's center of buoyancy is the point through which the resultant force is exerted on a body by a static fluid in which it is submerged, and which is located at the centroid of displaced volume.

In an embodiment where at least a portion of a submersible craft is permeable to a liquid and/or configured to operate while flooded, the various components within the submersible craft may have various centers of buoyancy. In this embodiment, the center of buoyancy of the submersible craft as a whole is the central point of the individual centers of buoyancy of the various components. The location of the center of buoyancy of the submersible craft may be calculated using vector addition and accounting for the position of the various individual centers of buoyancy, as well as the value of the buoyant force at each of the various individual centers of buoyancy. In this sense, the position of components within the submersible vehicle that have positive buoyancy have an effect on the center of buoyancy of the submersible vehicle.

A submerged craft's center of gravity is the point from which the weight of the submerged craft may be considered to act. Stated alternatively, a submerged craft's center of gravity is the point in or near the craft at which the gravitational potential energy of the craft is equal to that of a single particle of the same mass located at that point and through which the resultant of the gravitational forces on the component particles of the craft acts. In this sense, the position of components within the submersible vehicle has an effect on the center of gravity of the submersible vehicle.

The center of buoyancy of submersible craft 100, 200, and 300 creates a force upward from submersible craft 100, 200, and 300 toward the surface of the liquid medium in which it operates. The center of gravity of submersible craft 100, 200, and 300 creates a force downward from submersible craft 100, 200, and 300 toward the floor of the liquid medium in which it operates. If there is a differential between the center of buoyancy of submersible craft 100, 200, and 300 and the center of gravity of submersible craft 100, 200, and 300, such as through a difference in position of the battery 106, 206, and 406 and MEH 104 and 204, then submersible craft 100, 200, and 300 will orient itself such that its center of gravity is below its center of buoyancy. Accordingly, if battery 106, 206, and 406 comprises a substantially negative buoyancy and MEH 104 and 204 comprises a substantially positive buoyancy, then shifting battery 106, 206, and 406 to an upper position within submersible craft 100, 200, and 300 using a battery rail apparatus and shifting MEH 104 and 204 to a lower position within submersible craft 100, 200, and 300 using an MEH rail apparatus will cause the center of gravity of submersible craft 100, 200, and 300 to be higher than its center of buoyancy upon replacement in a liquid medium. The result of such a relationship between the center of gravity of submersible craft 100, 200, and 300 and the center of buoyancy of submersible craft 100, 200, and 300 is that submersible craft 100, 200, and 300 will invert when placed back in the liquid medium, so as to orient its center of gravity lower than its center of buoyancy, and its substantially negative buoyancy battery 106, 206, and 406 lower than its substantially positive buoyancy MEH 104 and 204.

In another embodiment, MEH 104 and 204 can comprise a substantially negative buoyancy and battery 106, 206, and 406 can comprise a substantially positive buoyancy. Accordingly, if battery 106, 206, and 406 comprises a substantially positive buoyancy and MEH 104 and 204 comprises a substantially negative buoyancy, then shifting battery 106, 206, and 406 to a lower position within submersible craft 100, 200, and 300, and shifting MEH 104 and 204 to an upper position within submersible craft 100, 200, and 300 will cause the center of gravity of submersible craft 100, 200, and 300 to be higher than its center of buoyancy. The result of such a relationship between the center of gravity of submersible craft 100, 200, and 300 and the center of buoyancy of submersible craft 100, 200, and 300 is that submersible craft 100, 200, and 300 will invert when placed back in the liquid medium, so as to orient its center of gravity lower than its center of buoyancy.

Figure 5:
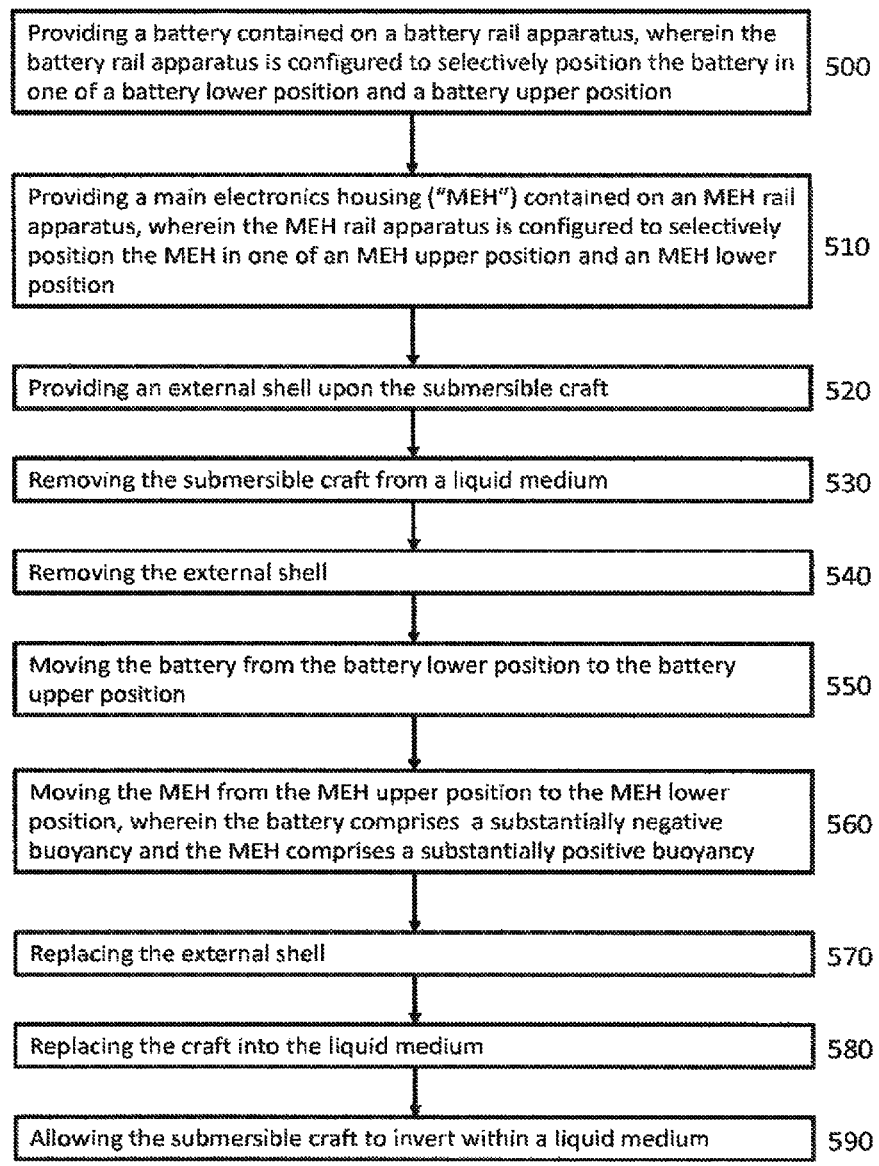
FIG. 5 is a flowchart illustrating an example method for inverting a submersible craft.

FIG. 5 is a flowchart illustrating an example method for selectively inverting a submersible craft within a liquid medium. As shown in FIG. 5, the example method includes providing a battery contained on a battery rail apparatus, wherein the battery rail apparatus is substantially vertically positioned within the submersible craft and is configured to selectively position the battery in one of a battery lower position and a battery upper position (step 500). An MEH is provided contained on an MEH rail apparatus, wherein the MEH rail apparatus is substantially vertically positioned within the submersible craft and is configured to selectively position the MEH in one of an MEH upper position and an MEH lower position (step 510). An external shell is provided upon the submersible craft (step 520). The example method further includes removing the submersible craft from the liquid medium (step 530) and removing the external shell (step 540). The battery is moved from the battery lower position to the battery upper position (step 550) while the MEH is moved from the MEH upper position to the MEH lower position wherein the battery comprises a substantially negative buoyancy and the MEH comprises a substantially positive buoyancy (step 560). Finally, the method includes replacing the external shell (step 570), replacing the submersible craft into the liquid medium (step 580), and allowing the submersible craft to invert within the liquid medium (step 590).

In steps 540 and 570, the external shell may be removably fixed to frame 102, 202, and 302 using external shell fasteners, including for example captive screws, screws, bolts, clips, pins, straps, or cam locks. Removal and replacement of the external shell may include simply removing and replacing the external shell fasteners.

In step 550, moving battery 106, 206, and 406 from a battery lower position to a battery upper position may include removing for example a captive screw, bolt, pin, clip, or strap locking battery in battery lower position, sliding battery along battery rail apparatus to battery upper position until it encounters an upper stop, and replacing a captive screw, bolt, pin, clip, or strap locking battery in battery upper position.

In step 560, moving MEH 104 and 204 from an MEH upper position to an MEH lower position may include removing for example a captive screw, bolt, pin, clip, or strap locking MEH in MEH upper position, sliding MEH along MEH rail apparatus to MEH lower position until it encounters a lower stop, and replacing a captive screw, bolt, pin, clip, or strap locking MEH in MEH lower position.

In steps 530 and 580, the removal and replacement of submersible craft 100, 200, and 300 from the liquid medium may involve temporarily placing submersible craft 100, 200, and 300 on the deck of a ship, on land, on a dock, or on a stationary platform above the surface of the liquid medium. In one embodiment, the liquid medium is water in a pond, lake, stream, river, or ocean.

In step 590, submersible craft 100, 200, and 300 will attempt to invert without external force because it will orient its center of gravity below its center of buoyancy. However, in one embodiment it may be necessary to physically assist submersible craft 100, 200, and 300 in initially inverting.

In one embodiment, submersible craft 100, 200, and 300 further includes an acoustic beacon and/or relocation transponder. In one embodiment, the acoustic beacon/relocation transponder must be directed toward the surface of the liquid medium. In such an embodiment, the method of inverting submersible craft 100, 200, and 300 further includes adjusting the orientation of acoustic beacon/relocation transponder so it points downward during the flipping procedure. Upon replacement of submersible craft 100, 200, and 300 in the liquid medium, submersible craft 100, 200, and 300 will invert to orient its center of gravity below its center of buoyancy, thus causing acoustic beacon/relocation transponder to be directed upwardly toward the surface of the liquid medium after inversion of submersible craft 100, 200, and 300.

In one embodiment, submersible craft 100, 200, and 300 further includes a tether strain relief physically attaching submersible craft 100, 200, and 300 to a host ship, dry land, a dock, or a platform above the liquid medium. Tether strain relief may be physically attached to a lower portion of frame 102, 202, and 302. In such an embodiment, the method of inverting submersible craft 100, 200, and 300 further includes removing tether strain relief from submersible craft 100, 200, and 300 and reattaching it toward the top of submersible craft 100, 200, and 300 during the flipping procedure. Upon replacement of submersible craft 100, 200, and 300 in the liquid medium, submersible craft 100, 200, and 300 will invert to orient its center of gravity below its center of buoyancy, thus causing tether strain relief to be attached toward the bottom of submersible craft 100, 200, and 300 after inversion of submersible craft 100, 200, and 300.

Figure 6:
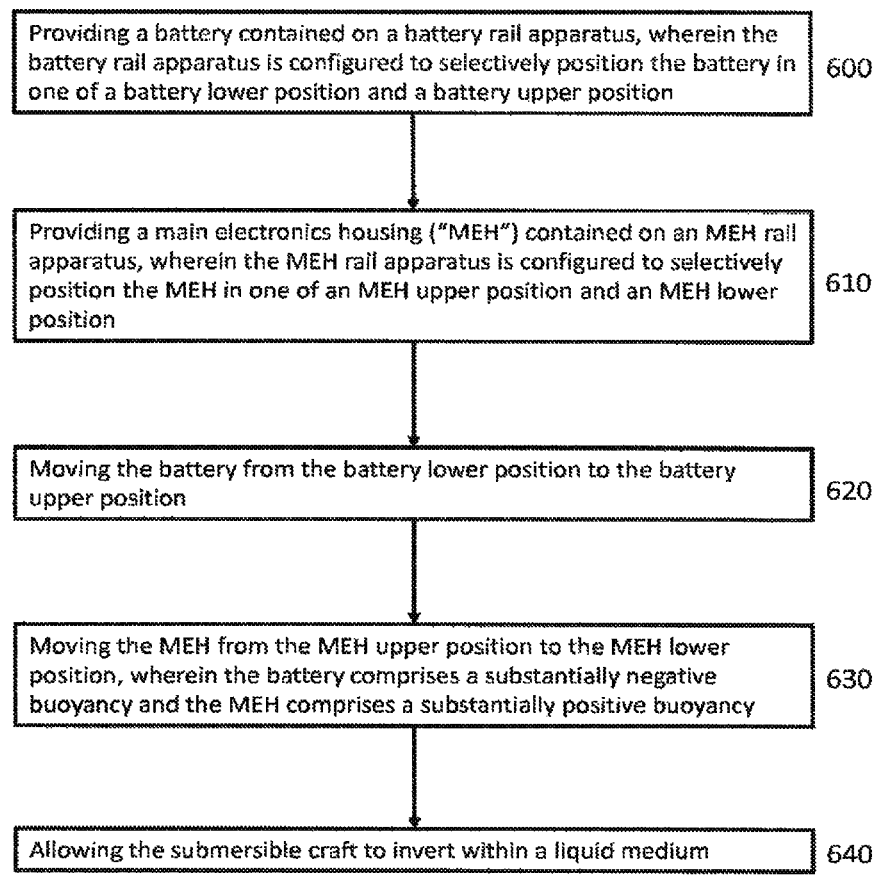
FIG. 6 is a flowchart illustrating an example method for inverting a submersible craft.

FIG. 6 is a flowchart illustrating an example method for selectively inverting a submersible craft within a liquid medium. As shown in FIG. 6 the example method includes providing a battery contained on a battery rail apparatus, wherein the battery rail apparatus is substantially vertically positioned within the submersible craft and is configured to selectively position the battery in one of a battery lower position and a battery upper position (step 600). An MEH is provided contained on an MEH rail apparatus, which is substantially vertically positioned within the submersible craft and is configured to selectively position the MEH in one of an MEH upper position and an MEH lower position (step 610). The example method further includes moving the battery from the battery lower position to the battery upper position (step 620) and moving the MEH from the MEH upper position to the MEH lower position wherein the battery comprises a substantially negative buoyancy and the MEH comprises a substantially positive buoyancy (step 630). Finally, the example method includes allowing the submersible craft to invert within the liquid medium (step 640).

Figure 7:
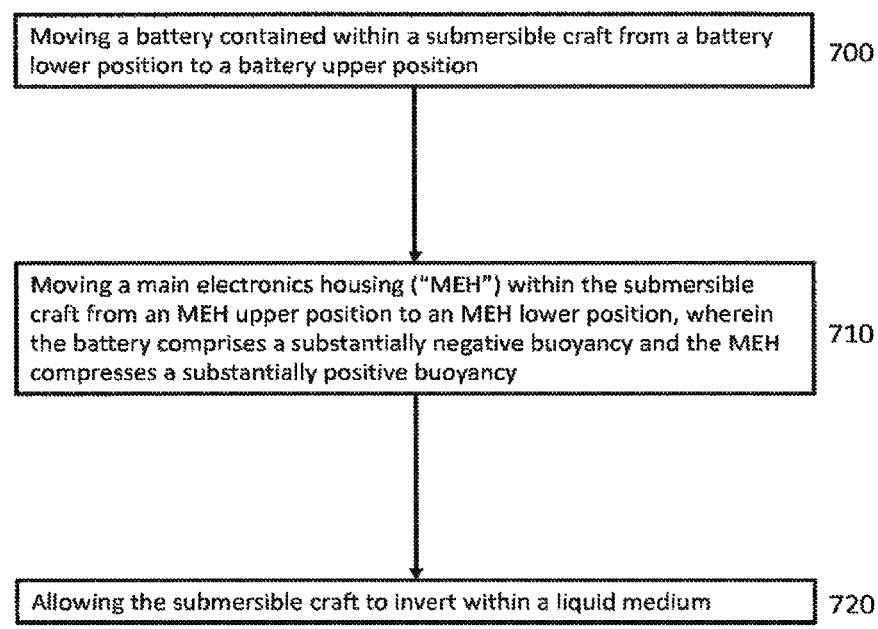
FIG. 7 is a flowchart illustrating an example method for inverting a submersible craft.

FIG. 7 is a flowchart illustrating an example method for selectively inverting a submersible craft within a liquid medium. As shown in FIG. 7 the example method includes moving a battery contained within the submersible craft from a battery lower position to a battery upper position (step 700) and moving an MEH within the submersible craft from an MEH upper position to an MEH lower position (step 710). Finally, the example method includes allowing the submersible craft to invert within the liquid medium (step 720).

Figure 8:
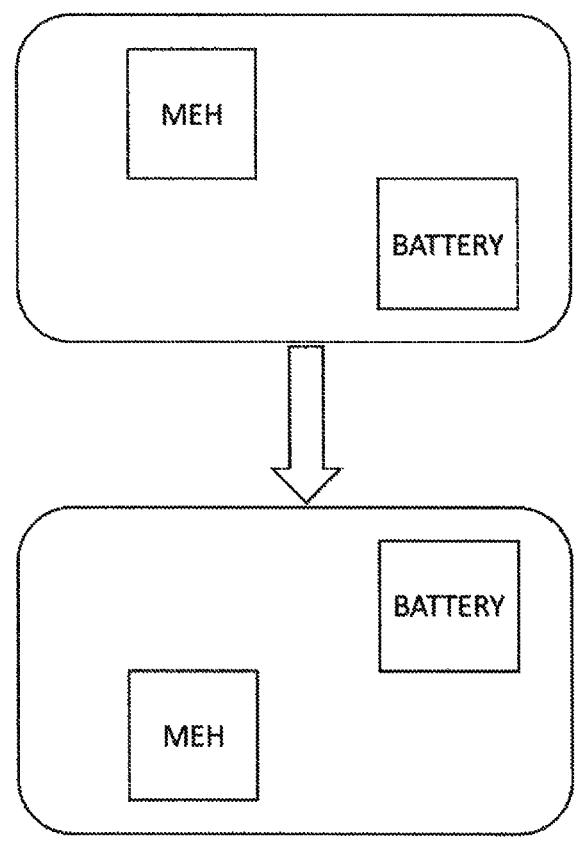
FIG. 8 is a simplified representation of the movements described in the flowcharts of FIGS. 5-7.

The movement of the MEH from an upper position to a lower position, and the movement of the battery from a battery lower position to a battery upper position, as described in FIGS. 5-7, is depicted, in simplified form, in FIG. 8.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. An apparatus for selectively repositioning a battery and a main electronics housing (MEH) within a submersible craft, comprising:
   a battery;
   a battery rail apparatus including a first battery frame rail substantially vertically oriented within the submersible craft and a second battery frame rail substantially vertically oriented within the submersible craft,
      wherein the first battery frame rail is positioned on a first side of the submersible craft opposite the second battery frame rail positioned on a second side of the submersible craft,
      wherein a first end of the battery is slidably connected to the first battery frame rail and a second end of the battery is slidably connected to the second battery frame rail;
   an MEH;
   an MEH rail apparatus including a first MEH frame rail substantially vertically oriented within the submersible craft and a second MEH frame rail substantially vertically oriented within the submersible craft,
      wherein the first MEH frame rail is positioned on a first side of the submersible craft opposite the second MEH frame rail positioned on a second side of the submersible craft, wherein a first end of the MEH is slidably connected to the first MEH frame rail and a second end of the MEH is slidably connected to the second MEH frame rail; and wherein the battery comprises a substantially negative buoyancy and the MEH comprises a substantially positive buoyancy.

2. The apparatus of claim 1, further comprising captive screws configured to prevent movement between the battery and the battery rail apparatus, and between the MEH and the MEH rail apparatus.

3. The apparatus of claim 1, further comprising a first battery rail, a second battery rail, a first MEH rail, and a second MEH rail, and wherein:
the first end of the battery is slidably connected to the first battery frame rail through the first battery rail;
the second end of the battery is slidably connected to the second battery frame rail through the second battery rail;
the first end of the MEH is slidably connected to the first MEH frame rail through the first MEH rail; and
the second end of the MEH is slidably connected to the second MEH frame rail through the second MEH rail.

4. An apparatus for selectively repositioning a battery and a main electronics housing (MEH) within a submersible craft, comprising:
a battery;
a battery rail apparatus substantially vertically oriented within the submersible craft,
wherein the battery rail apparatus includes a first battery rail and a second battery rail, and
wherein the first battery rail and the second battery rail are slidably connected to the submersible craft;
an MEH;
an MEH rail apparatus substantially vertically oriented within the submersible craft,
wherein the MEH rail apparatus includes a first MEH rail and a second MEH rail, and
wherein the first MEH rail and the second MEH rail are slidably connected to the submersible craft;
wherein the battery comprises a substantially negative buoyancy and the MEH comprises a substantially positive buoyancy.

5. The apparatus of claim 4, further comprising captive screws configured to prevent movement between the battery and the battery rail apparatus, and between the MEH and the MEH rail apparatus.

6. The apparatus of claim 4, further comprising a first battery frame rail, a second battery frame rail, a first MEH frame rail, and a second MEH frame rail, and wherein:
the first battery rail is slidably connected to the submersible craft through the first battery frame rail;
the second battery rail is slidably connected to the submersible craft through the second battery frame rail;
the first MEH rail is slidably connected to the submersible craft through the first MEH frame rail; and
the second MEH rail is slidably connected to the submersible craft through the second MEH frame rail.

7. A method for selectively inverting a submersible craft within a liquid medium, comprising:
moving a battery contained within the submersible craft from a battery lower position to a battery upper position; and
moving a main electronics housing (MEH) within the submersible craft from an MEH upper position to an MEH lower position,
wherein the battery comprises a substantially negative buoyancy and the MEH comprises a substantially positive buoyancy.

8. The method of claim 7, further comprising providing captive screws configured to prevent movement of at least one of the battery and MEH.

9. The method of claim 7, further comprising:
providing a battery rail apparatus, wherein the battery rail apparatus comprises a first battery rail configured to slidably connect to a first battery frame rail and a second battery rail configured to slidably connect to a second battery frame rail; and
providing an MEH rail apparatus, wherein the MEH rail apparatus comprises a first MEH rail configured to slidably connect to a first MEH frame rail and a second MEH rail configured to slidably connect to a second MEH frame rail.

10. The method of claim 9, further comprising providing captive screws configured to prevent movement of the battery rail apparatus.

11. The method of claim 9, further comprising providing captive screws configured to prevent movement of the MEH rail apparatus.

12. The method of claim 7, wherein the battery is contained on a battery rail apparatus, and wherein the battery rail apparatus is substantially vertically positioned within the submersible craft and is configured to selectively position the battery in one of the battery lower position and the battery upper position.

13. The method of claim 12, wherein the battery rail apparatus comprises a first battery frame rail and a second battery frame rail.

14. The method of claim 7, wherein the MEH is contained on an MEH rail apparatus, and wherein the MEH rail apparatus is substantially vertically positioned within the submersible craft and is configured to selectively position the MEH in one of the MEH upper position and the MEH lower position.

15. The method of claim 14, wherein the MEH rail apparatus comprises a first MEH frame rail and a second MEH frame rail.

* * * * *